US006011578A

United States Patent [19]

Shatto et al.

[11] Patent Number: 6,011,578

[45] Date of Patent: Jan. 4, 2000

[54] SYSTEM FOR COLLECTING AUDIENCE RESPONSE DATA

[75] Inventors: Billy Wayne Shatto, Norwalk, Calif.; Eric Louis Zager, Seattle, Wash.; David P. Castler, Granada Hills, Calif.

[73] Assignee: Consumer Dynamics LLC, Granada Hills, Calif.

[21] Appl. No.: 08/975,285

[22] Filed: Nov. 20, 1997

[51] Int. Cl.[7] .................... H04N 7/00

[52] U.S. Cl. .................... 348/1; 348/12; 455/2; 341/22; 341/35

[58] Field of Search .................... 455/2, 154.1; 348/1, 348/2, 12, 13; 341/20, 22, 35; 345/184, 168; 364/709.01; 340/825.77, 825.96

[56] References Cited

U.S. PATENT DOCUMENTS 5,801,754 9/1998 Ruybal et al. .................... 348/13

*Primary Examiner*—Andrew I. Faile
*Assistant Examiner*—Sam Huang
*Attorney, Agent, or Firm*—Blakely Sokoloff Taylor & Zafman LLP

[57] ABSTRACT

A system and apparatus for collecting response data. A response unit is provided having a dial, keypad, and a biconditional response mechanism. The response unit operates in two modes, a dial mode and a keypad mode. Mode is determined by the power supplied to the response unit. If the power supply supplies a first voltage, the response unit will be in one mode, and if the power supply supplies a second voltage, the response unit will be in a second mode. In dial mode, the keypad is inactive. The response unit sources a voltage along a continuum based on the positioning of the dial. The biconditional response mechanism may also be active and when activated, causes the response unit to source an analog voltage outside the dial's continuum. In keypad mode, the dial is inactive, and each key of the keypad is associated with a unique voltage within a voltage range such that pressing a key causes the associated voltage to be sourced by the response unit. Regardless of the mode, the response unit sources an analog voltage reflecting user response. That voltage is converted to a digital voltage by an analog to digital (A/D) converter. The A/D converter is controlled by a response collection driver operating on a host computer. The driver directs the A/D to sample the data from the response unit, receives the digital value and manipulates the data to provide meaningful market research information.

8 Claims, 8 Drawing Sheets

SYSTEM FOR COLLECTING AUDIENCE RESPONSE DATA

BACKGROUND OF THE INVENTION (1) Field of the Invention

The invention relates to a system for market research. More specifically, the invention relates to a system for collecting audience response data.

(2) Related Art

For many years, the motion picture industry has used test screenings to determine appropriate editing for motion pictures. Typically, audiences were given a hand-held controller with a dial thereon and gradations from very dull to very good. The audience member then turns the dial to the particular location that they believe reflected their attitude towards the film at any particular time. In this way, scenes that had a favorable audience response could be retained, while those to which the audience responded unfavorably could be reduced or eliminated. However, this dial system makes a collection of demographic data and/or responses to multiple choice or biconditional questions difficult to obtain. Typically, questions needed to be phrased such as if you agree, turn the dial all the way to very good, and if not, turn the dial all the way to very dull. Alternatively, paper questionnaires were passed out. To the extent that the audience bothered to fill out the questionnaires, a significant data entry task lay ahead in order to enter the data into the computer so that it could be manipulated and used in a meaningful way.

In view of the foregoing, it would be desirable to have a system which more easily accommodates responses to biconditional and/or multiple choice questions and retains the dial continuous monitoring of audience response.

BRIEF SUMMARY OF THE INVENTION

A system and apparatus for collecting response data is disclosed. A response unit is provided having a dial, keypad, and a biconditional response mechanism. The response unit operates in two modes, a dial mode and a keypad mode. Mode is determined by the power supplied to the response unit. If the power supply supplies a first voltage, the response unit will be in one mode, and if the power supply supplies a second voltage, the response unit will be in a second mode. In dial mode, the keypad is inactive. The response unit sources a voltage along a continuum based on the positioning of the dial. The biconditional response mechanism may also be active and when activated, causes the response unit to source an analog voltage outside the dial's continuum. In keypad mode, the dial is inactive, and each key of the keypad is associated with a unique voltage within a voltage range such that pressing a key causes the associated voltage to be sourced by the response unit.

Regardless of the mode, the response unit sources an analog voltage reflecting user response. That voltage is converted to a digital voltage by an analog to digital (A/D) converter. The A/D converter is controlled by a response collection driver operating on a host computer. The driver directs the A/D to sample the data from the response unit, receives the digital value and manipulates the data to provide meaningful market research information.

DETAILED DESCRIPTION OF THE INVENTION

Figure 1:
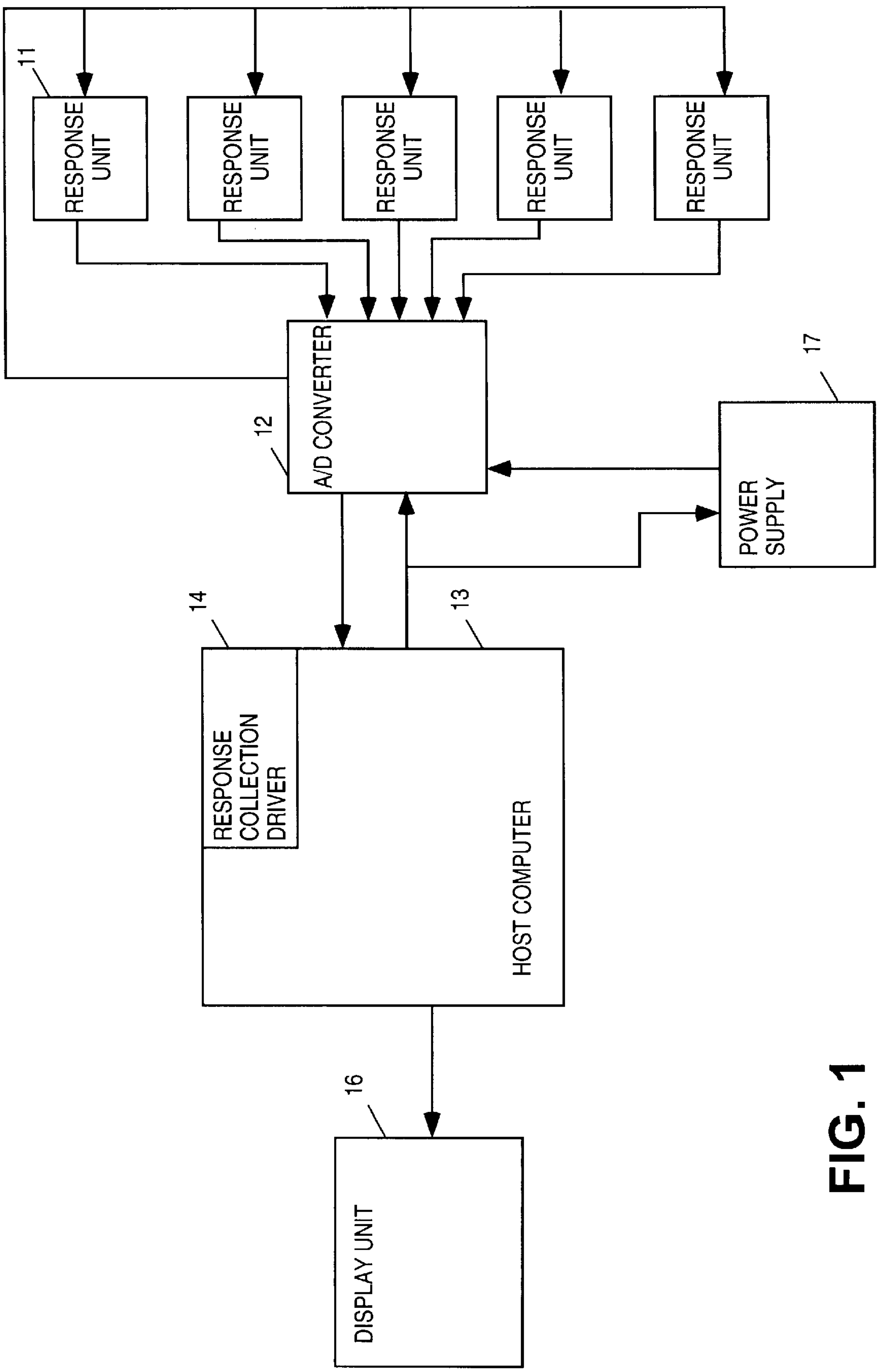
FIG. 1 is a block diagram of a system of one embodiment of the invention.

FIG. 1 is a block diagram of a system of one embodiment of the invention. A plurality of response units is provided for users to provide responses to questions or other sensory stimuli by manipulating a dial and/or keypad on the response unit. The response units generate analog voltage signals responsive to manipulation of the dial or keypad thereon. These analog voltage signals are sampled by an analog to digital (A/D) converter 12 which converts the signals to a digital form and provides them to a host computer 13 responsive to a response collection driver 14 executing thereon. The response collection driver 14 may then manipulate the data collected and displayed on display unit 16. A DC power supply 17 provides power to the A/D converter 12. The A/D converter 12 provides a DC power supply to each of the response units whose analog output it converts. The power supply provides two levels of power. In one embodiment, the power supply provides either 8 volts or 9 volts depending on the signal received from the response collection driver 14 on host computer 13. As explained further below, the voltage selected dictates a mode in which the response unit 1 operates.

In one embodiment of the invention, each A/D converter 12 can fan out into 32 response units. Thus, if more than 32 response units are required, each group of 32 requires an additional A/D converter 12 to permit proper processing. It is anticipated that several A/D converters 12 can operate off a single power supply 17. However, providing a separate power supply 17 for each A/D converter 12 is within the scope and contemplation of the invention. A suitable A/D converter is available from Washington Electronics of Sydney, Australia.

Figure 2:
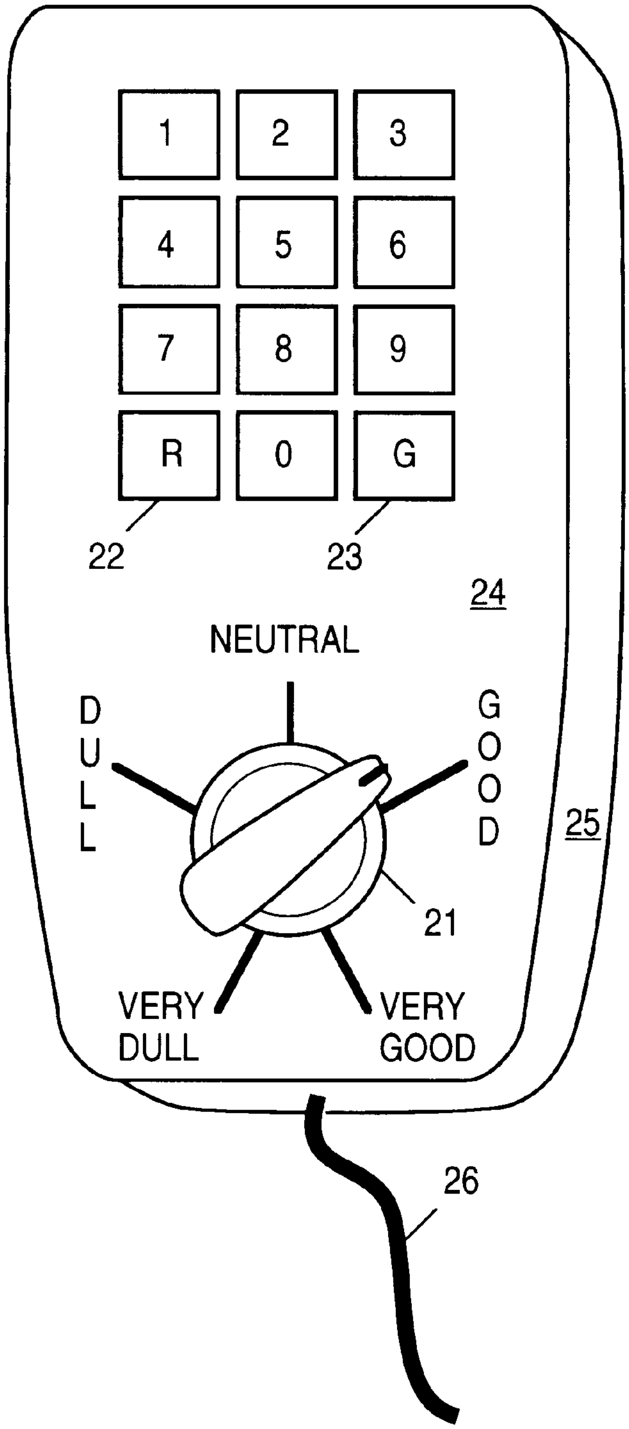
FIG. 2 is a perspective view of a response unit of one embodiment of the invention.

FIG. 2 is a perspective view of a response unit of one embodiment of the invention. Response unit includes a dial 21 and may have demarcations consistent with the dials used in the prior art or other suitable demarcations depending on the data to be collected. Additionally, the response unit has a keypad provided thereon. The keypad includes keys 0 through 9 and two biconditional keys, a red or "no" key 22, and a green or "yes" key 23. Based on the power supplied to the response unit, the unit will be in either dial mode or keypad mode. Thus, either the dial 21 will be active or the keypad will be active, but not both. However, in dial mode, both the dial 21, and the biconditional keys 22, 23 are active. Similarly, when the keypad is active, the biconditional keys 22, 23 are active. The addition of the keypad and the biconditional keys 22, 23 which remain active regardless of whether the keypad or the dial is currently active facilitates the acquisition of meaningful audience response data.

Facing plate 24 and housing 25 encase electronics which generate analog voltages responsive to key presses and/or dial position. Notably the biconditional keys need not generate the same voltage in both dial and keypad mode as long as the driver knows what to expect based on the mode. Cord 26 provides the power from the power supply, as well as transmitting the output voltages to the A/D converter for conversion to a digital format which may be stored and manipulated on the host computer.

Figure 3:
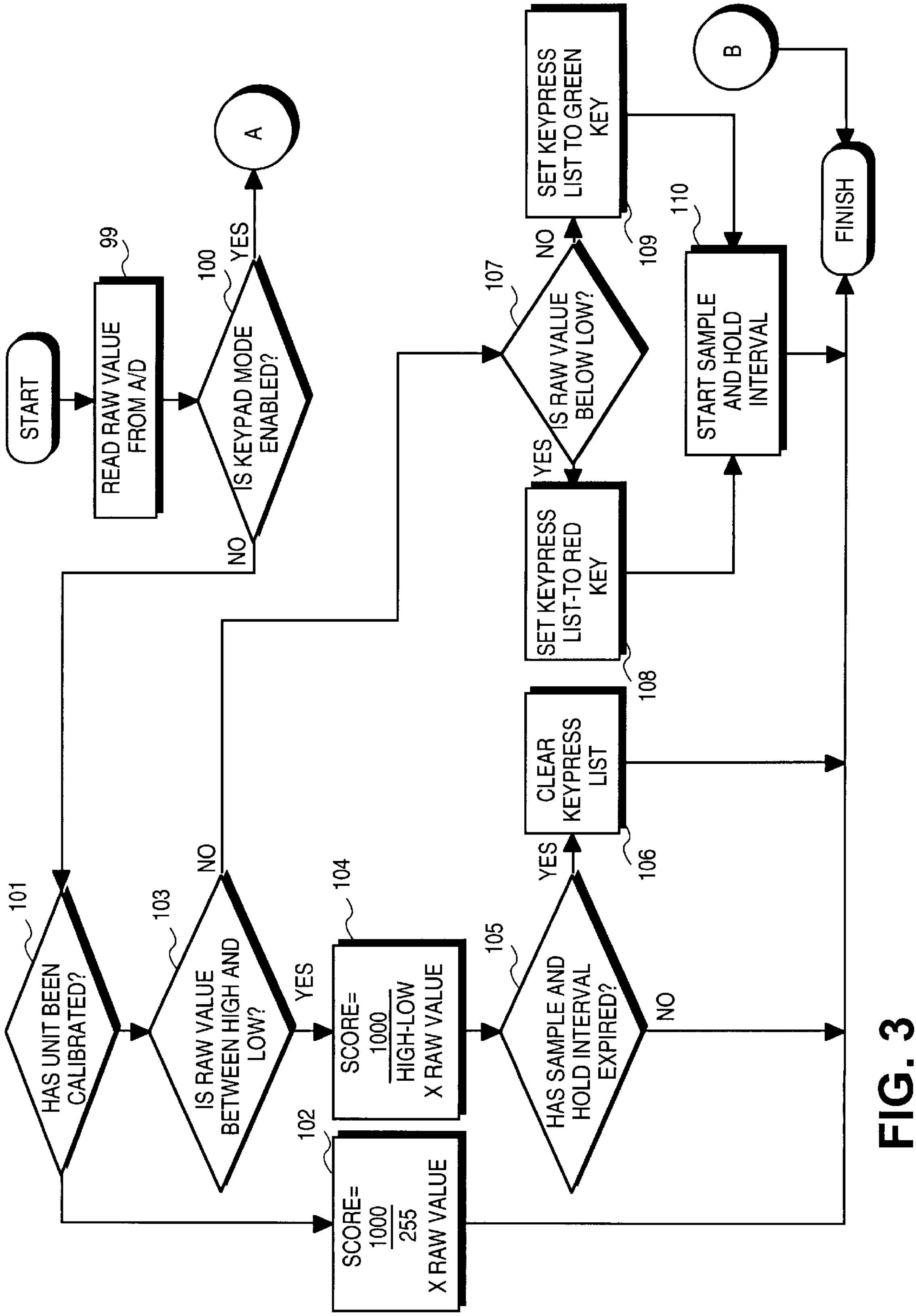
FIGS. 3 and 4 are a flowchart of a response collection routine of a response by the response collection driver of one embodiment of the invention.
Figure 4:
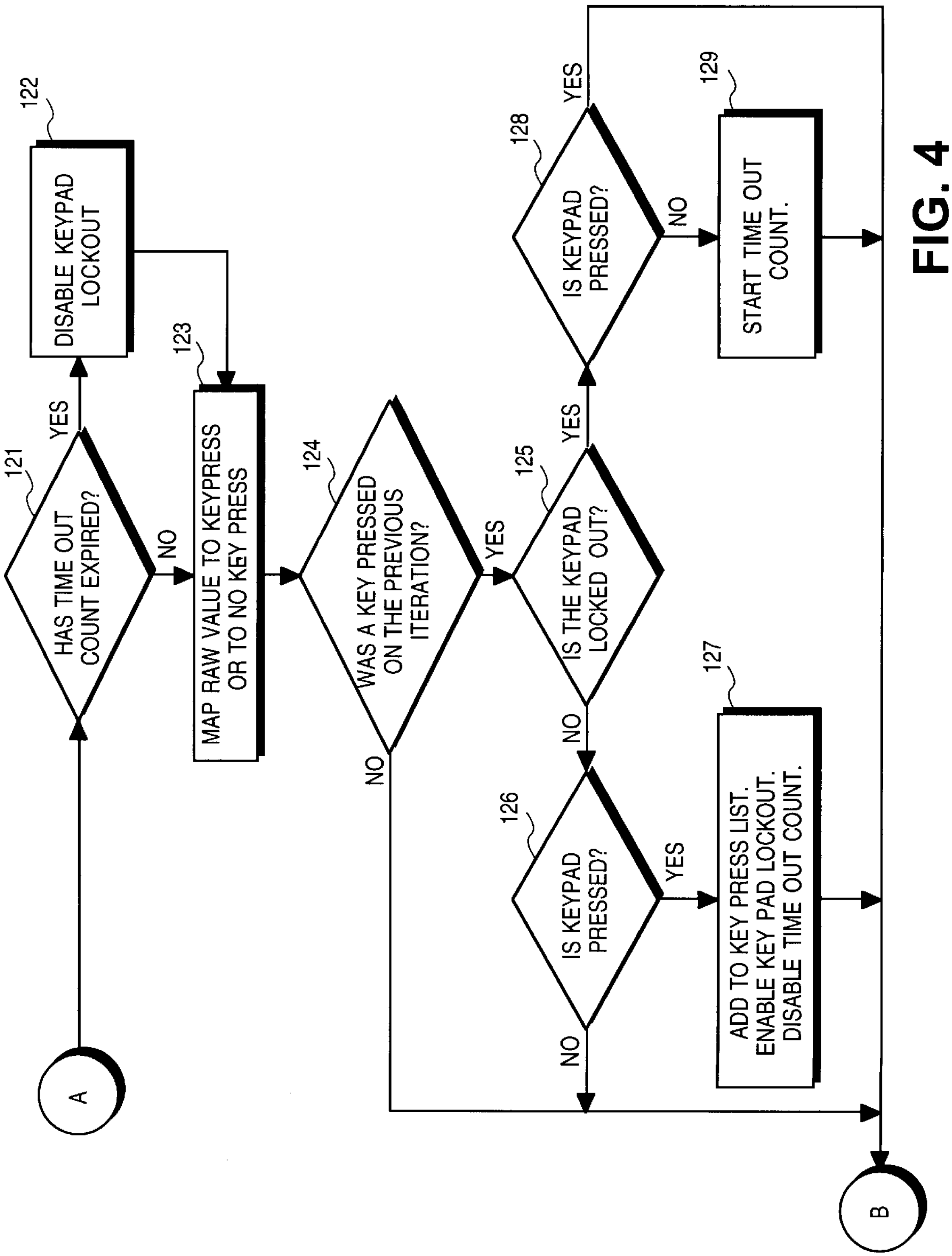

FIGS. 3 and 4 are a flowchart of a response collection routine of a response by the response collection driver of one embodiment of the invention. Before entering this routine, the driver instructs the A/D converter to sample the values from the response units and requests the converted data be forwarded to the host. The converted data for the sampling of each connected response unit is stored in a buffer for use as described below. At decision block 100, it is determined whether the response units are in keypad mode or dial mode. As indicated above, the response units are placed in one mode when the driver causes the power supply to supply a first voltage and in another mode when the driver causes the power supply to supply a second voltage. Accordingly, in one embodiment, the driver sets an internal register on the host computer when it sets the mode. In this embodiment, the determination at decision block 101 is made by reading the register. In an alternate embodiment, the driver makes the determination by reading the voltage supplied by the supply. This embodiment ensures that a correct decision will be made independent of any register value in the host.

If the response device is in dial mode, a determination is made at decision block 101 whether the unit has been calibrated. When the dial is operating, turning the dial all the way to the left ("Very Dull") will yield a voltage some distance above the minimum circuit voltage, usually ground. Similarly, turning the dial all the way right ("Very Good") will yield a voltage below the positive voltage rail. In a separate routine, the driver calibrates each response unit by reading the values after the audience has been instructed to turn the dial all the way one way, then all the way the other. This calibration step serves a dual purpose. It calibrates the response unit to determine the full range of normal dial values, and also determines if an audience member is using a particular unit. If no change occurs during the calibration step, it is assumed that no one is using the dial, and the data from that unit can be ignored by the driver for the remainder of the session. Thresholds above and below which the value is determined to be a key press may be determined dynamically to be offset some distance from the high and low calibration values. The distance provides some noise protection reducing the likelihood that a dial response will be interpreted as a key press. Alternatively, the high and low thresholds can be preset based on known characteristics of the dial. This method of establishing thresholds eliminates the possibility that a user might not turn the dial through its full range during calibration thereby establishing incorrect thresholds. Such incorrect thresholds from dynamic allocation may cause incorrect interpretation of an incoming voltage as being a key press. At functional block 102, if the unit has not been calibrated, a score is computed using the raw value received from the A/D converter. The score is defined to be 1,000÷255×the raw value. This score is tagged to permit resynchronization with the real time events to which the score corresponds.

At decision block 103, if the unit has been calibrated, a determination is made as to whether the raw value is between a high threshold and low threshold values corresponding to the calibration or preset thresholds. If the values fall between the high and low value, a score is computed using a different formula at functional block 104. In this case, the score=1,000÷(the high calibration value−the low calibration value)×(the raw value−the low calibration value). The score is also tagged so as to be synchronizable with the real time events precipitating the score. After computation of the score at functional block 104, decision block 152 in conjunction with functional block 154 clamp the lower limit of the score to zero. This is necessary because noise or user sloppiness during calibration may result in scores less than zero in the above formula. Similarly, decision block 153 in conjunction with functional block 155 clamps the maximum score to 1000. After this clamping, a determination is made if the sample and hold interval has expired, at decision block 105. If it has, the key press list is cleared at functional block 106. If the raw value is determined not to be between the high and the low at decision block 103, a determination is made at decision block 107 whether the raw value is below the low. If it is, the key press list is set to the red ("*" or "no") key at functional block 108. If the raw value is not below the low at decision block 107, the key press list is set to the green ("#" or "yes") key. After the key press list is set, either functional blocks 108 or 109, the sample and hold interval is started at functional block 110. The sample and hold interval retains the values corresponding to the red or green key in the key press list for a period of time sufficient for other parts of the driver to have access to that value as needed. In one embodiment, the key press list for each response unit in dial mode is defined to hold only a single entry. Switching mode always clearing the key press list. After any of blocks 102, 105, 106, or 110, the routine finishes. Once finished, the generated score or key press is available for further processing or statistical manipulation.

If at decision block 100 keypad mode is enabled, a determination is made at decision block 121, whether the time-out count has expired. If the time-out count has expired, keypad lockout is disabled at functional block 122. The time-out count in conjunction with the keyboard lockout ensures that a long key press, e.g., when a respondent holds a key down, is not interpreted as several presses of the same key. This will be explained further below.

If the time and count have not expired or after keypad lockout has been disabled, the raw value received from the A/D is mapped to either key press or no key press at functional block 123. This state information is retained for use during subsequent iterations. The range of the A/D converter is 0–255. Each key is mapped to a unique subrange within the full range. A subrange is also mapped to no key pressed. This is true because when the driver requests sampling and a return value from the A/D, the A/D samples and returns a value even if no key is pressed.

In one embodiment, no key pressed condition is mapped to the top of the full range. Also, in one embodiment, the subranges mapped to each key and "no key" may not fill the entire range and may be separated by subranges of values that should never occur. Occurrence of those values should generate an error. However, because of the ramping effect discussed below, care must be taken to be sure the voltage has stabilized at an error value. In the usual case, the raw value will map to either a particular key or no key. As indicated above, the value assigned to the red and green keys need not be the same in both dial and keypad mode. For purpose of state, if the value returned does not fall in the no key subrange, it is presumed to fall within the key pressed subrange even if the particular sample does not correspond to any key.

A determination is then made at decision block 124 whether a key was pressed on the previous iteration of the routine by determining whether on that iteration the raw value is mapped to key press or no key press. If a key was not pressed, the routine finishes, because it has been found that a certain ramping effect occurs such that on the first time a key press is available, the value returned may not be the true value. By the second iteration, the value has leveled off to the expected value. Therefore, the driver discards the first value provided responsive to a key press and collects the data on the second iteration.

On the second iteration with the key pressed, the determination is made at functional block 125 whether the keypad is locked out. If the keypad is locked out, a determination is made at decision block 128 if a key is pressed. If the key is pressed, the routine ends because as long as the key continues to be pressed, no time-out count should be initiated because there is no guarantee the key will be released before the time-out expires. If it is not released and the time-out interval expires, the unreleased key would be interpreted as an additional key press. If the key is not pressed, the time-out count is started at functional block 129. As indicated above, once a determination of no key press is made, the concern of misinterpreting a long key press as multiple key presses is removed. Accordingly, a time-out count is started. The time-out count prevents additions to the key press list for its duration. This provides a safety margin preventing noise effects from being interpreted as multiple key presses. For example, if "no key" is mapped to 255 and a number e.g. "7" is mapped to 253, then noise may cause one press of 7 to be sampled as 253~255~253. Without the time-out count holding the key press list static, an extra "7" would be added to the key press list. Additional steps such as expanding the range between mapping also reduce the significance of noise.

If the keypad is not locked out at decision block 125, a decision is made whether the key is pressed at decision block 126. If the key is not pressed, the routine ends since there is nothing to add to the key press list. If the key is pressed, the key is added to the key press list, keypad lock-out is enabled, and the time-out count is disabled at functional block 127. While disabled, the time-out count cannot expire. On the next iteration, the routine will necessarily follow the path from block 121 to blocks 122–125 to block 128 and only if the key is no longer pressed will the time-out count be started (so that it may have expired by the next iteration). Once added to the key press list, further processing of the key presses including sorting and statistical manipulation can be carried out by other routines in the driver.

Figure 5A:
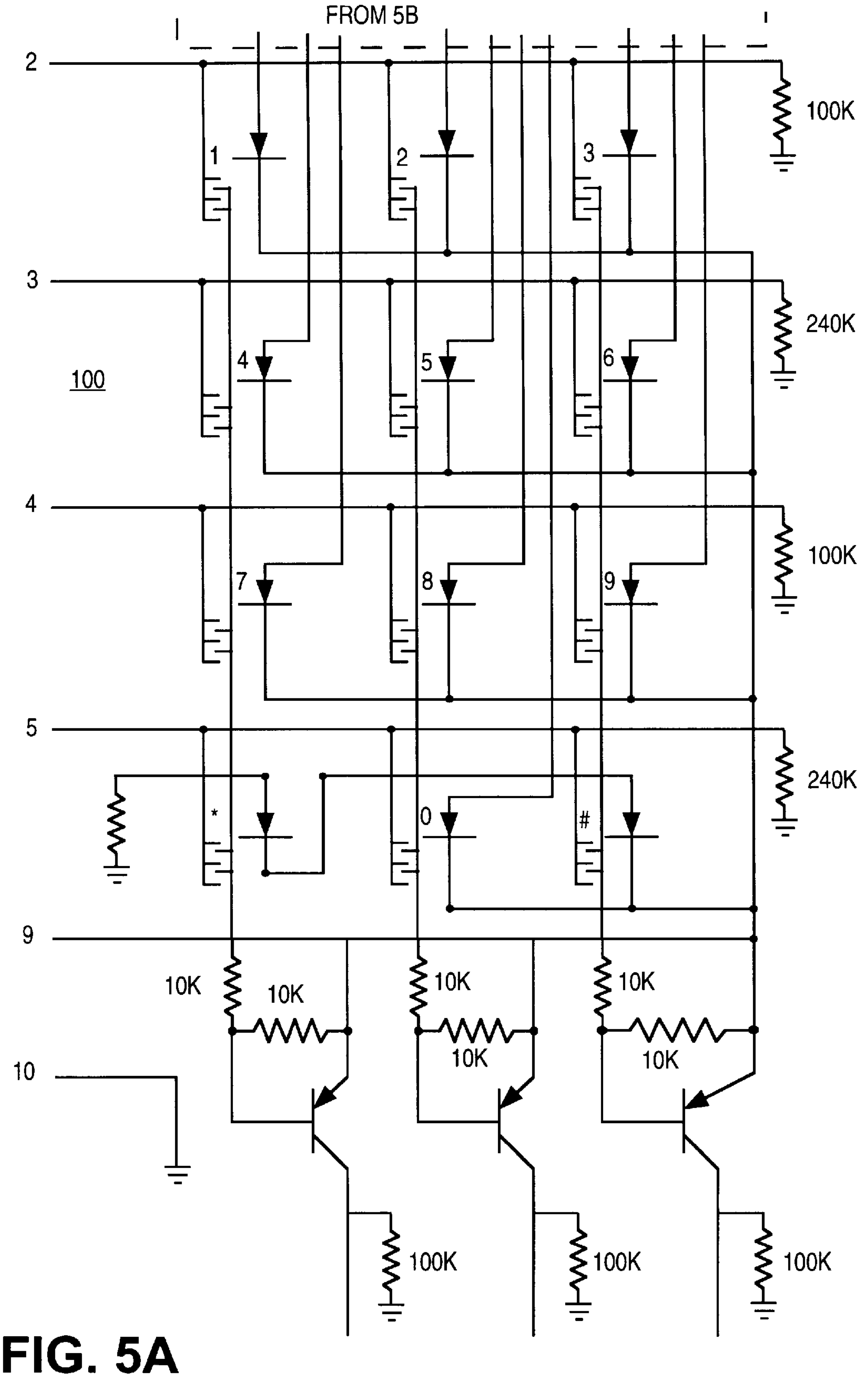
FIGS. 5*a–d* are a schematic of the circuitry inside a response unit in one embodiment of the invention.

FIGS. 5*a–d* are a schematic of the circuitry inside a response unit in one embodiment of the invention. FIG. 5*a* shows the keypad 100, each key of the keypad having an associated light emitting diode (LED). The LEDs back light a pressed key. The biconditional response (button) (red or *, and green or #) keys are always backlighted. The keyboard outputs are coupled to combinational encoding logic shown in FIG. 5*d*. The encoding logic generates a four bit binary code corresponding to the key pressed. In one embodiment, the coding represents a two-bit horizontal address and a two-bit vertical address. For example, the address may be a four bit value with D0 and D1 corresponding to the horizontal address, biconditional while D2 and D3 correspond to the vertical address of the pressed key.

Figure 5B:
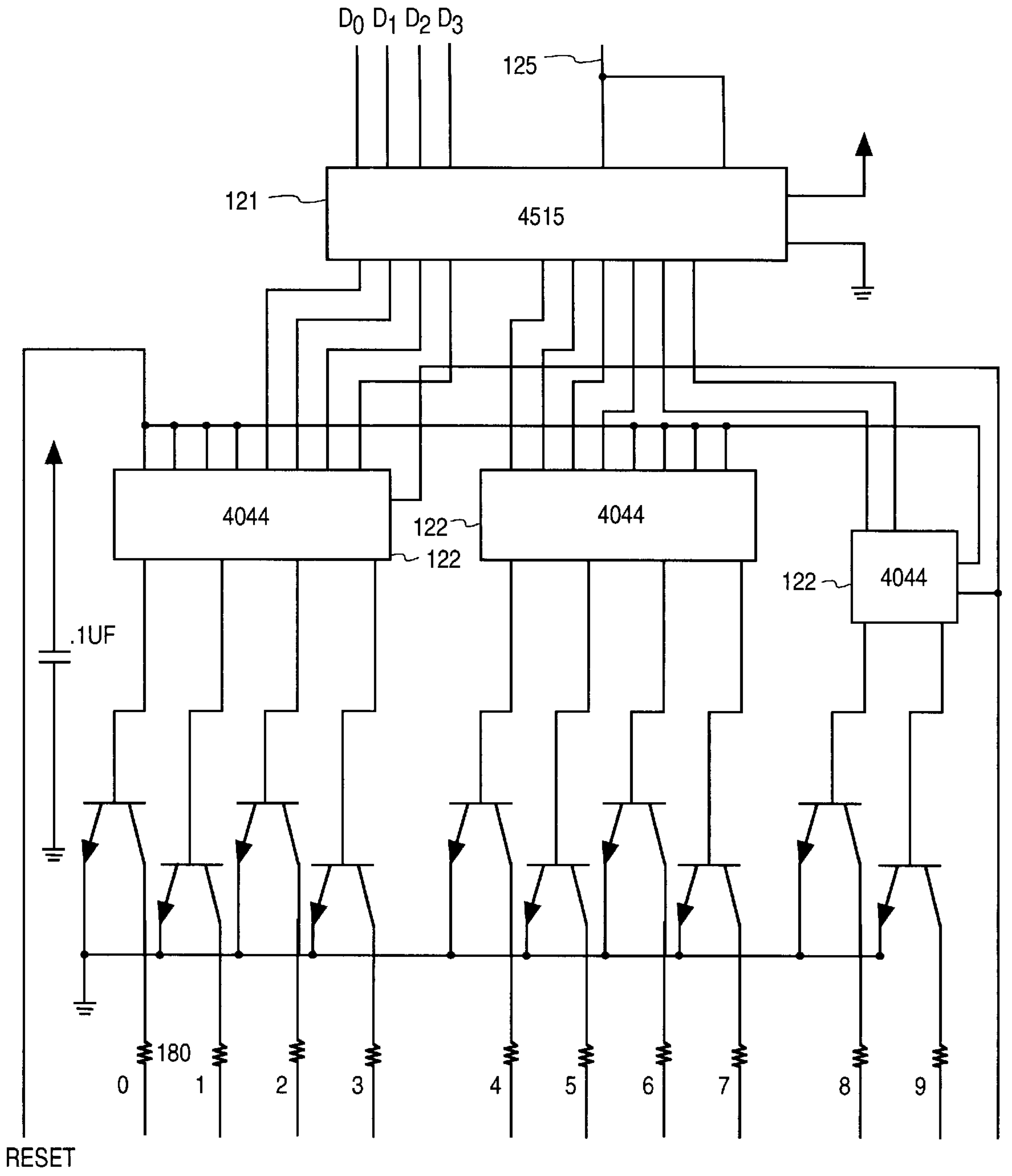
Figure 5C:
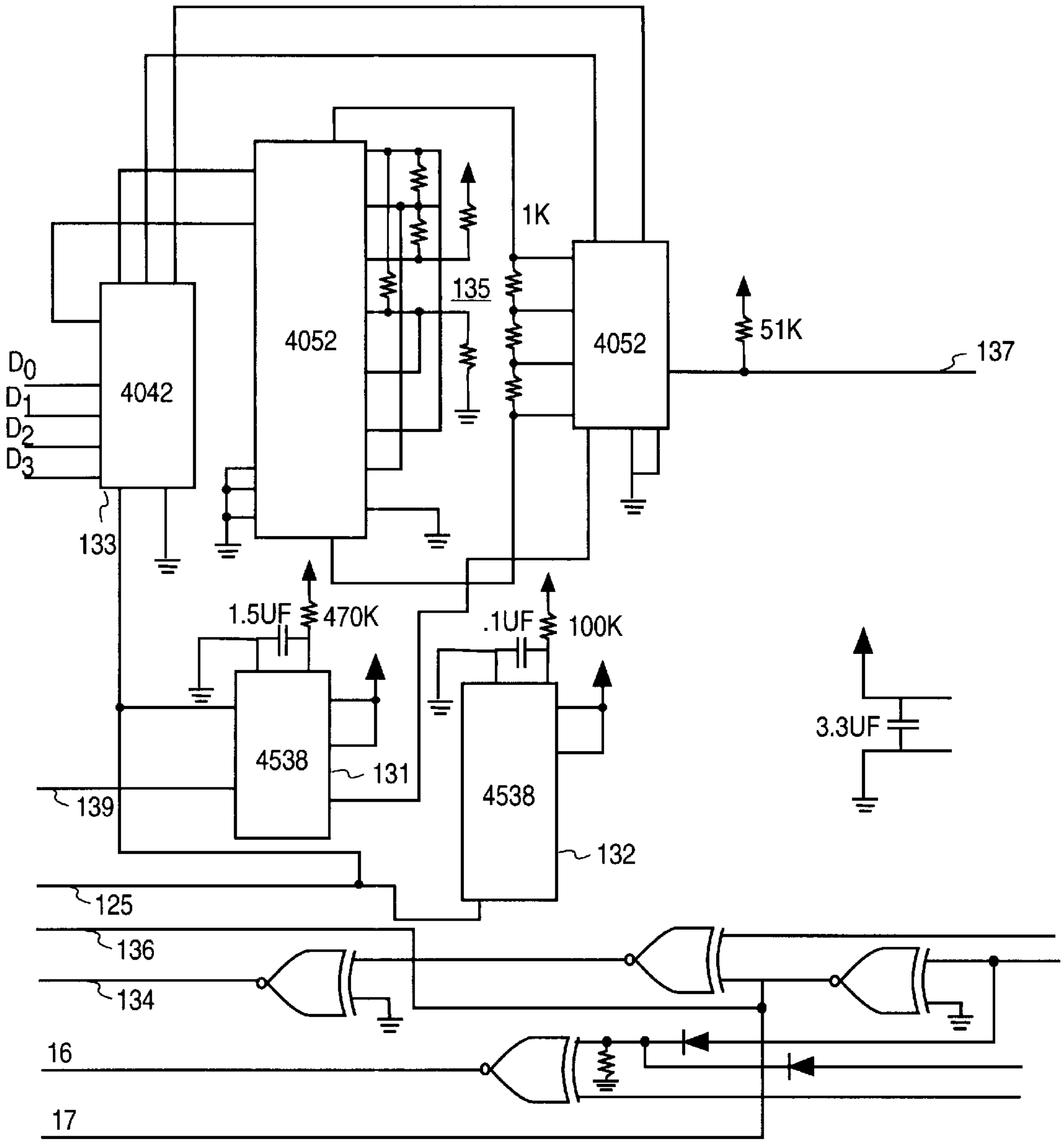
Figure 5D:
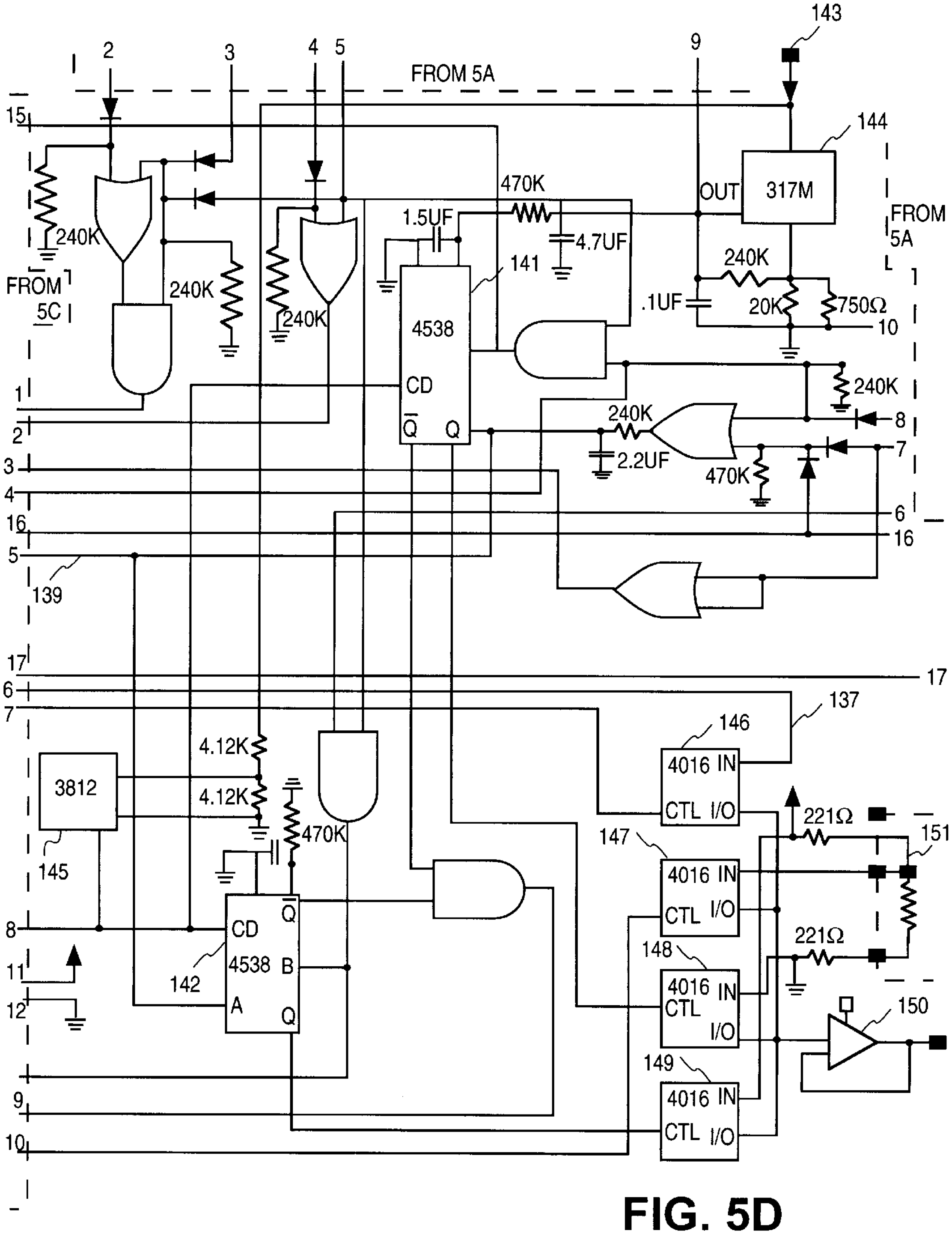

The red and green keys are also decoded by combinational logic shown in FIG. 5*d*. Signals from the red and green keys drive monostables 141 and 142, respectively. The monostables hold the corresponding signal asserted for a predetermined time period, typically 600–800 ms. A suitable monostable is the CD4538 available from National Semiconductor.

The keypad address is input to a decoder as shown in FIG. 5*b*. A decoder 121 decodes the address and the decoded address corresponding to the pressed key is latched into latches 122. The decoder 121 is enabled by a strobe signal 125 generated by a monostable 132 (FIGS. 5*c*). Accordingly, latches 122 retain the latched value for the monostable time period. For example, if the "3" key is pressed, the included address would be 1000. The decoded latched value is 0001000000. A suitable latch and decoder are CD4044 and CD4515, respectively, both available from National Semiconductor. This output drives a plurality of bipolar junction transistors (BJTs). This output causes the corresponding LED to back light the pressed key while the latched value is retained (e.g., 750 ms). In this embodiment, as mentioned above, the red and green keys are always back lighted by LEDs.

Decoding the key pressed to an analog voltage is shown in FIG. 5*c*. A monostable 131 responsive to the key pressed signal 139 enables a latch 133 to latch in the key address. A suitable latch is the CD4042 available from National Semiconductor. This causes the latch to hold the address for, e.g., 750 ms, long enough to ensure proper sampling. During this time, the address is continually supplied to a multiplexer/demultiplexer and resistive ladder 135, thereby generating the analog output 137 corresponding to the key pressed. Additional combinational decoding logic is shown in FIG. 5*c*. Particularly, a keyboard switch signal 136 and a potentiometer enable signal 139 are generated.

FIG. 5*d*, in addition to the monostables 141, 142 and the combinational encoding logic, shows power supply line 143 into which the power supply sources either a first voltage corresponding to keypad mode or a second voltage corresponding to dial mode. In an exemplary embodiment, the first voltage is 8 volts, and the second voltage is 9 volts. A 5 volt voltage regulator 144 is supplied to insure that the 8 or 9 volt input voltage does not overdrive the combinational logic. A voltage detector 145, for example, a 3812 available from Panasonic, is used to determine the mode of the response unit.

When in dial mode, the dial and the biconditional keys are active. The dial is instantiated as a potentiometer 151 with a maximum upper and lower voltage some distance from the respective power rail. In this mode, the press of the red key sources the voltage of the lower power rail (e.g., ground), while a press of the green button sources the voltage of the upper power rail (e.g., 5V). In keypad mode, each key is decoded to a unique voltage, and the dial is inactive. Some additional combinational logic in conjunction with the keyboard switch signal 136, the key pressed signal 139, and the monostables 141, 142 containing the red/green indication control, a set of analog switches 146–149 which control which input mechanism (dial, keypad, red, green) will provide the output voltage to the A/D converter. The combinational logic ensures that no more than one of the four switches is turned on at any time. The outputs of all four switches are tied to a voltage follower 150. The single switch 146–149 that is on supplies a voltage to the voltage follower 150. The voltage follower 150, in turn, provides the voltage to the A/D converter which samples when directed by the driver as discussed above.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

We claim:

1. A method of collecting audience response data comprising the steps of:

providing a response unit having a dial, and keypad and a biconditional response mechanism, the response unit operable in a dial mode and a keypad mode;

driving the response unit into a first mode or a second mode, wherein in the first mode only the keypad and the biconditional response mechanism are active and wherein in the second mode only the dial and the biconditional response mechanism are active, the mode being driven responsive to application of a first power supply voltage or a second power supply voltage;

sampling an analog voltage generated by the response unit; and converting the analog voltage to a digital voltage.

2. The method of claim 1 further comprising determining a mode of operation;

converting a digital voltage to a score if the voltage is generated by the dial;

adding a key to a key press list if the voltage is generated by the keypad.

3. The method of claim 2 further comprising the step of:

calibrating the response unit.

4. The method of claim 3 wherein the step of calibrating comprises turning the dial all the way to the left;

sampling an output voltage corresponding to a dial minimum;

turning the dial all the way to the right; and sampling a dial maximum.

5. An apparatus for obtaining response data from a user, the apparatus comprising:

a dial defining a response continuum, the dial active at a first voltage level;

a keypad having a plurality of keys, the keypad active at a second voltage level;

a biconditional response mechanism active at least at the first voltage level; and circuitry coupled to each of the dial, the keypad, and the biconditional mechanism, the circuitry generalizing an analog voltage within a dynamic range, the voltage determined by a position of the dial when the dial is active and generating a voltage corresponding to the key pressed predefined as when a key is pressed if the keypad is active.

6. The apparatus of claim 4 wherein the biconditional response mechanism is active at both the first and the second voltage levels.

7. The apparatus of claim 5 wherein when the dial is active, wherein one biconditional response generates a voltage above the dynamic range and another biconditional response generates a voltage below the dynamic range.

8. A system for obtaining audience response data comprising:

an analog to digital converter A/D;

a processor coupled to the A/D;

a response unit coupled to the A/D, the response unit having a keypad, a dial for response and a biconditional response mechanism;

a power supply coupled to the A/D generating a first voltage and a second voltage wherein when the power supply generates the first voltage, only the keypad and the biconditional response mechanism are active, and when the power supply generates the second voltage, only the dial and the biconditional response mechanism are active; and a response collection driver executing on a host processor.

* * * * *

UNITED STATES PATENT AND TRADEMARK OFFICE

CERTIFICATE OF CORRECTION

PATENT NO. : 6,011,578
DATED : January 4, 2000
INVENTOR(S) : Shatto et al.

It is certified that error appears in the above-identified patent and that said Letters Patent is hereby corrected as shown below:

Column 7,
Line 13, please delete "converting a digital voltage" and insert --converting the digital voltage --.

Column 8,
Line 8, please delete "The apparatus of claim 4" and insert --The apparatus of claim 5 --.

Signed and Sealed this

Nineteenth Day of June, 2001

*Attest:*

Nicholas P. Godici

NICHOLAS P. GODICI

*Attesting Officer* *Acting Director of the United States Patent and Trademark Office*